United States Patent
Andersson

(10) Patent No.: US 7,556,674 B2
(45) Date of Patent: Jul. 7, 2009

(54) METHOD AND DEVICE FOR THE SEPARATION OF DUST PARTICLES

(75) Inventor: Rune Andersson, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 263 days.

(21) Appl. No.: 11/587,358

(22) PCT Filed: May 20, 2005

(86) PCT No.: PCT/SE2005/000735

§ 371 (c)(1),
(2), (4) Date: Oct. 25, 2006

(87) PCT Pub. No.: WO2005/114053

PCT Pub. Date: Dec. 1, 2005

(65) Prior Publication Data

US 2008/0028935 A1    Feb. 7, 2008

(30) Foreign Application Priority Data

May 21, 2004    (SE)    .................................... 0401304

(51) Int. Cl.
*B01D 45/00* (2006.01)
(52) U.S. Cl. ............................. 95/267; 55/319; 55/428; 55/462
(58) Field of Classification Search .................. 55/394, 55/396, 428, 440, 443, 462, 465, 319; 95/267, 95/272; 96/64
See application file for complete search history.

(56) References Cited

U.S. PATENT DOCUMENTS

| | | | | |
|---|---|---|---|---|
| 1,639,179 A | * | 8/1927 | Hamel | 261/17 |
| 3,426,507 A | * | 2/1969 | Kossowski et al. | 96/62 |
| 3,435,593 A | * | 4/1969 | Nordone | 95/221 |
| 3,990,871 A | * | 11/1976 | Cooper | 96/64 |
| 4,695,297 A | * | 9/1987 | Hein | 96/32 |

(Continued)

FOREIGN PATENT DOCUMENTS

DE    4112454    10/1992

(Continued)

OTHER PUBLICATIONS

Handbook of Separation Techniques for Chemical Engineers, 1988, McGraw-Hill, inc, 2nd ed., pp. 6-40-6-42.*

*Primary Examiner*—Duane Smith
*Assistant Examiner*—Sonji Turner
(74) *Attorney, Agent, or Firm*—Timothy J. Olson

(57) ABSTRACT

A device (16) for separating particles (MP) from a flue gas flow (F) has a horizontal flue gas duct (18), through which the flue gas flow (F) is passed substantially horizontally from a first position (P1) to a second position (P2). In the first position (P1), the device (16) has a baffle arrangement (32), which comprises at least one plate (34, 36, 38) which is arranged in the flue gas duct (18) and which is inclined so as to deflect particles (MP) down to the lower portion (42) of the horizontal flue gas duct (18). In the second position (P2), the device (16) has a collecting means (40), which is arranged in the lower portion (42) of the flue gas duct (18) to collect the particles (MP) which have been deflected downwards by the plate (34, 36, 38) to the lower portion (42) of the flue gas duct (18).

4 Claims, 6 Drawing Sheets

U.S. PATENT DOCUMENTS

| | | | | |
|---|---|---|---|---|
| 4,857,276 A | * | 8/1989 | Seto et al. | 422/171 |
| 5,156,658 A | * | 10/1992 | Riehl | 96/64 |
| 5,687,656 A | | 11/1997 | Kaneko et al. | |
| 5,687,657 A | | 11/1997 | Ziegler | |
| 5,697,403 A | * | 12/1997 | Onishi et al. | 138/37 |
| 6,994,036 B2 | * | 2/2006 | Grommes et al. | 110/165 A |
| 7,252,701 B2 | * | 8/2007 | Tolvanen | 95/74 |

FOREIGN PATENT DOCUMENTS

| | | |
|---|---|---|
| EP | 0177667 | 4/1986 |
| GB | 1135244 | 12/1968 |

* cited by examiner

METHOD AND DEVICE FOR THE SEPARATION OF DUST PARTICLES

FIELD OF THE INVENTION

The present invention relates to a method for separating particles from a flue gas flow which is passed substantially horizontally in a flue gas duct from a first position to a second position.

The present invention also relates to a device for separating particles from a flue gas flow, which device has a horizontal flue gas duct, through which flue gas is passed substantially horizontally from a first position to a second position.

BACKGROUND ART

Flue gas cleaning plants for, inter alia, coal-fired and oil-fired power stations, waste incineration plants etc. often have what is referred to as an SCR reactor. An SCR (Selective Catalytic Reduction) reactor involves a reactor in which a catalytically induced, selective reduction of nitrogen oxides occurs. The SCR reactor has a catalyst, which often is configured as a honeycomb structure or as a number of closely spaced plates to provide a maximum reactive surface. A drawback in many SCR reactors is that particulate dust, which is formed in the burning of, for instance, coal, oil or waste, gets stuck in the SCR reactor and clogs it.

U.S. Pat. No. 5,687,656 in the name of Kaneko et al discloses a method of reducing the amount of dust that reaches and clogs an SCR reactor. In the method according to U.S. Pat. No. 5,687,656, a flue gas is first passed in a horizontal flue gas duct, then in a vertical flue gas duct and subsequently through a porous plate, which has a pore size smaller than the particles that are to be separated.

The method according to U.S. Pat. No. 5,687,656 may cause a reduction of the amount of dust that reaches the SCR reactor. A problem with this porous plate, however, is the risk of it being clogged by dust particles. Such clogging causes an increase in pressure drop and, thus, increased operating expenses.

SUMMARY OF THE INVENTION

An object of the present invention is to provide a method of separating particles from a flue gas, which method wholly or partly eliminates the above drawbacks.

This object is achieved by a method of separating particles from a flue gas flow, which is passed substantially horizontally in a flue gas duct from a first position to a second position, said method being characterised in that in the first position the particles are subjected to deflection downwards to the lower portion of the flue gas duct, and that in said second position the particles are collected at the lower portion of the flue gas duct.

An advantage of this method is that the deflection, which can be provided by simple means and with a low pressure drop, in the first position surprisingly provides a considerable up-concentration of particles at the lower portion of the duct. In particular large particles, such as particles larger than about 1 mm, will be heavily deflected and in such a manner that they are not redispersed in the flue gas flow. The collection in the second position occurs at the lower portion of the flue gas duct, i.e. precisely where the particles have been up-concentrated. This means that the collection does not have to occur from the entire flue gas flow but only from that partial flow of the flue gas flow in which the particles have been up-concentrated.

In a preferred embodiment, the particles are deflected downwards at an angle of 40-70° to the horizontal plane. An angle of 40-70° has been found to give the optimum deflection of the particles. At an angle which is smaller than about 40° the deflection will not be sufficiently great and the particles will thus not be up-concentrated at the lower portion of the flue gas duct but will be redispersed in the flue gas. At an angle which is greater than about 70°, the pressure drop will increase. There is also a risk that the deflection will be so great that the particles bounce against the bottom of the flue gas duct and are redispersed in the flue gas flow.

In a preferred method, the flue gas flow is in the second position divided into a first partial flow, which contains the deflected particles and which is deflected from the lower portion of the flue gas duct and is passed downwards into a collecting chamber, and a second partial flow. The first partial flow provides a simple and reliable way of removing by few movable parts the particles that have been up-concentrated from the flue gas flow at the lower portion of the flue gas duct.

Preferably, the first partial flow is made to undergo a sharp turn in the collecting chamber, the particles being thrown out of the first partial flow and separated in the collecting chamber. To remove the particles by centrifugal force from the first partial flow has the advantage that a net, porous plates and other means which can easily be clogged are not necessary for the separation of the particles. This results in great reliability in operation.

In a preferred method, the velocity of the flue gas flow is decreased by a factor which is 1.2 to 2.5, while the flue gas flow is passed from the first position to the second position. An advantage of this is that the particles which in the first position have been deflected to the lower portion of the flue gas duct will not be redispersed in the flue gas flow as this is passed from the first position to the second position. On the contrary, the decreasing gas velocity will result in further up-concentration of the particles at the lower portion of the duct owing to what can be designated as a settling effect.

A further object of the present invention is to provide a device for effective separation of particles from a flue gas, in which device the above-mentioned drawbacks are wholly or partly eliminated.

This object is achieved by a device which is of the type defined by way of introduction and characterised in that the device in the first position has a baffle arrangement, which comprises at least one plate which is arranged in the flue gas duct and which is inclined so as to deflect particles down to the lower portion of the horizontal flue gas duct, and that the device in the second position has a collecting means, which is arranged in the lower portion of the flue gas duct to collect the particles which have been deflected downwards by the plate to the lower portion of the flue gas duct. An advantage of this device is that it provides effective separation of the particles that may be expected to clog an SCR reactor without causing a high pressure drop or a risk of the device being clogged.

In a preferred embodiment, said at least one plate makes an angle of 40-70° to the horizontal plane. A plate with such an angle has been found to imply that particles effectively bounce down to the lower portion of the flue gas duct.

Preferably the collecting means has a deflecting wall, which opposite to the flow direction of the flue gas flow extends into the flue gas duct in the lower portion thereof and which above the bottom of the flue gas duct is terminated by a deflecting line, and which wall is arranged to deflect from the flue gas flow a partial flow, which contains the deflected particles and is arranged to be passed into a collecting chamber included in the collecting means. The deflecting wall results in effective collection of the particles that have been deflected in the first position without causing a high pressure drop or a risk of clogging.

Suitably the collecting chamber has a collecting wall, which extends from the collecting chamber portion which is positioned closest to the first position, to the deflecting wall at a level below the deflecting line. An advantage of the collecting wall is that it improves the removal of particles from the partial flow and reduces the risk that already separated particles in the collecting chamber should be entrained by the flue gas flow.

The baffle arrangement suitably comprises at least three inclined plates. With at least three inclined plates, a baffle arrangement can be provided, which has a low pressure drop and which causes a small risk that particles pass the baffle arrangement without bouncing on a plate and being deflected to the lower portion of the flue gas duct. Depending on the height of the flue gas duct in the vertical direction, it may often be convenient to use even more plates, such as 4, 5 or 6 plates or even more.

In a preferred embodiment, the cross-sectional area of the horizontal flue gas duct is 1.2-2.5 times greater in the second position than in the first position. This relationship between the cross-sectional areas means that the velocity of the flue gas is reduced, which improves the separation of particles in the second position. The cross-sectional area of the flue gas duct in the second position should be at least 1.2 times the cross-sectional area of the flue gas duct in the first position so as to prevent the particles deflected to the lower portion of the flue gas duct from being redispersed in the flue gas. In an area relationship which is greater than 2.5, a separation also of very small particles is provided, which still do not cause a risk of clogging of, for instance, an SCR reactor but are rather separated in a dust separator arranged after the SCR reactor.

Preferably, the length of the flue gas duct from the first position to the second position is at least twice its characteristic cross-sectional dimension, such as a diameter or a height, in the first position. Such a length gives also the particles, which are positioned close to the upper portion of the flue gas duct as they are being deflected by the baffle arrangement, enough time to move down to the lower portion of the flue gas duct so as to be separated in the collecting means. If the cross-sectional area of the flue gas duct increases from the first position to the second position, the above-mentioned length is also necessary for the flue gases to have time to spread in the increased cross-sectional area and cause the reduction of velocity requested in such a case.

Additional features and advantages of the present invention will be evident from the following description and the accompanying drawings.

BRIEF DESCRIPTION OF THE DRAWINGS

The invention will now be further described by way of a number of embodiments and with reference to the accompanying drawings.

DETAILED DESCRIPTION OF PREFERRED EMBODIMENTS

Figure 1:
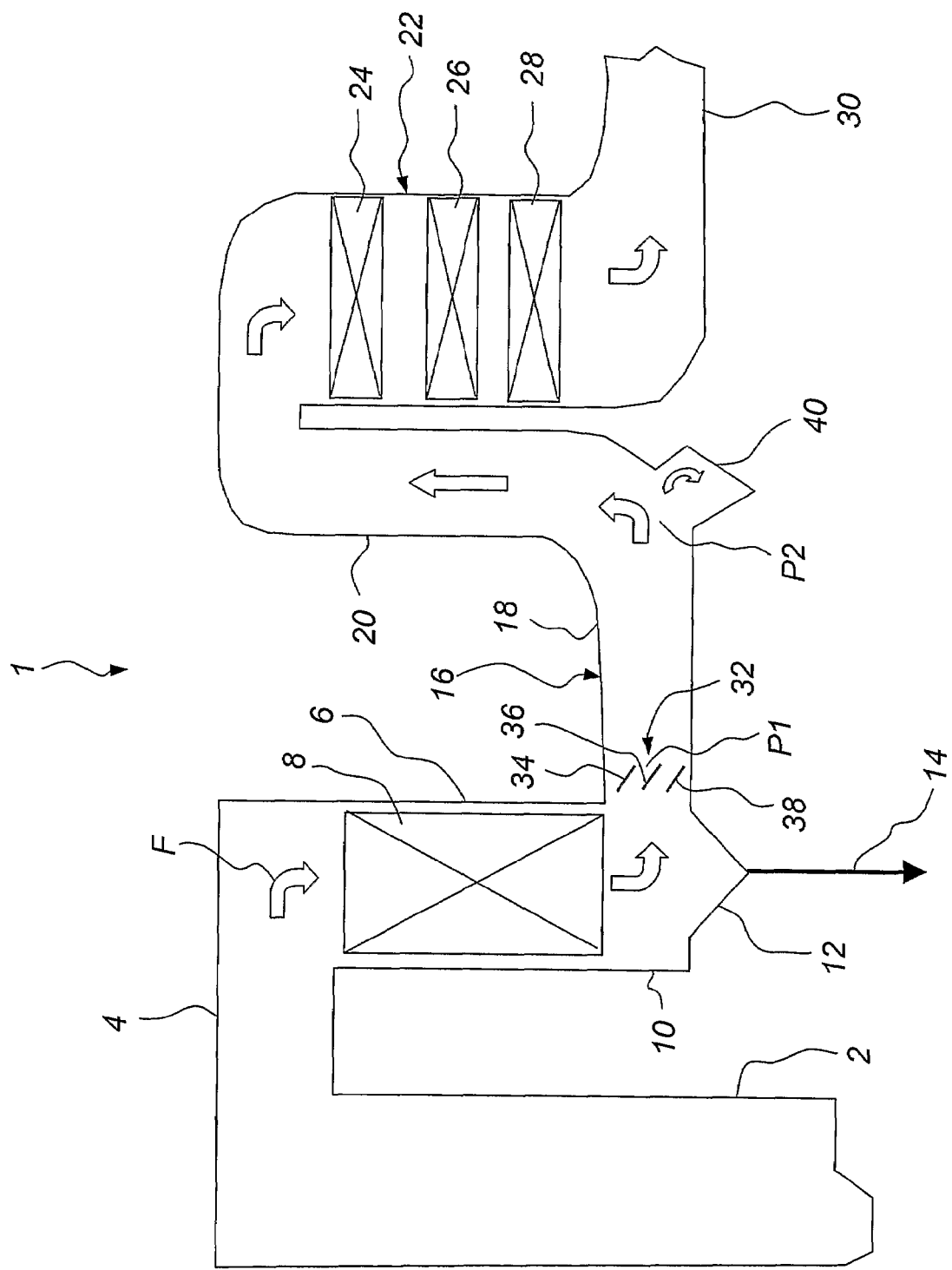
FIG. 1 is a schematic side view and shows a power station which is equipped with a device according to the invention.

FIG. 1 shows a power station 1. The power station 1 has a boiler 2, in which a fuel, such as coal, oil or waste, is burnt by being contacted with supplied air. The flue gases F and the particles formed in the burning are passed through a duct 4 to a flue gas cooler, also referred to as an economiser, 6. In the flue gas cooler 6 heat is extracted from the flue gases as they are being passed vertically downwards through a package of tubes 8 and there being brought into indirect contact with the feed water of the boiler 2. The flue gas cooler 6 has in its lower portion 10 a dust hopper 12 which collects some coarse particles. A discharge device 14 is used to remove such collected coarse particles. In the lower portion 10 of the flue gas cooler 6, the flue gases change from a vertical direction of flow to a horizontal direction of flow and are passed into a device 16 according to the invention.

The device 16 has a horizontal flue gas duct 18, which passes the flue gases in a substantially horizontal direction from a first position P1, which is located in the connection of the flue gas duct 18 to the lower portion 10 of the flue gas cooler 6, to a second position P2 in which the direction of the flue gases is changed to vertical and the flue gases are passed vertically upwards in a vertical flue gas duct 20. The flue gases are then turned through 180° and passed into an SCR reactor 22, which is intended for selective catalytic reduction of nitrogen oxides. In the shown embodiment the SCR reactor 22 has three catalyst layers 24, 26, 28 which contain a catalyst formed to a honeycomb structure. The flue gases pass through a number of narrow ducts, which typically have openings which are 4 by 4 mm in cross-section, in the catalyst while the nitrogen oxide content of the flue gases is reduced. The flue gases leave the SCR reactor 22 through a gas duct 30 and are then further cleaned, for instance, in an electrostatic precipitator and a flue gas desulphurisation plant, which are not shown in FIG. 1, so as then to be released into the atmosphere.

The particles collected in the dust hopper 12 are only the coarsest particles. The flue gas leaving the lower portion 10 of the flue gas cooler 6 will therefore contain a large number of particles that have such a size that, if they reached the catalyst layers 24, 26, 28, they would clog the narrow ducts in the honeycomb structure and cause an increased pressure drop and impaired reduction of nitrogen oxides. For the purpose of avoiding such problems, the device 16 has been provided with a baffle arrangement 32, which has three inclined plates 34, 36, 38, in the first position P1, and a collecting means 40 in the second position P2.

Figure 2:
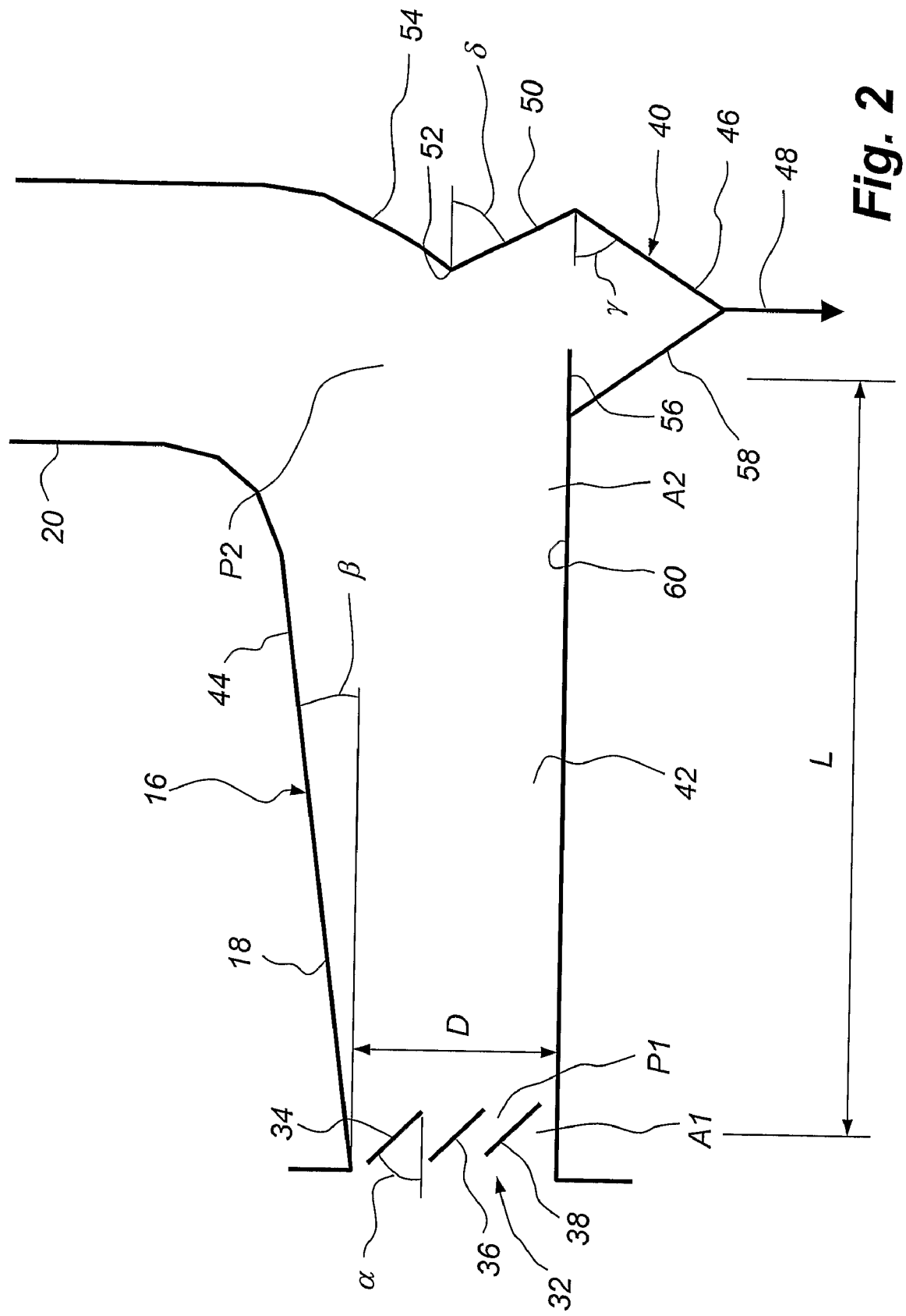
FIG. 2 is a side view and shows the device according to the invention in more detail.

FIG. 2 shows the device 16 in more detail. The baffle arrangement 32 arranged in the first position P1 has, as mentioned above, three plates 34, 36, 38. These plates, which are placed vertically one above the other, are inclined so as to deflect flue gases, in the form of a flue gas flow F, and above all particles by a "bouncing effect" down to the lower portion 42 of the flue gas duct 18. As is evident from FIG. 2, the plates 34, 36, 38 are inclined at an angle α of about 45° to the horizontal plane seen in the flow direction of the flue gas flow F and are thus, seen in the flow direction of the flue gas flow, directed downwards. As shown in FIG. 2, the flue gas duct 18 has an upper wall 44 which, seen in the flow direction of the flue gas flow, is inclined upwards at an angle β to the horizontal plane. The angle β is about 10°. This angle implies that the cross-sectional area A2 of the flue gas duct 18 in the second position P2 will be about 1.5 times the cross-sectional area A1 in the first position P1. The flue gas duct 18 has a length L which is about 3.5 times the dimension D of the flue gas duct 18, which dimension can be a height or a diameter according to the shape of the duct, in the first position P1.

The collecting means 40, which is arranged in the lower portion 42 of the flue gas duct 18, is located in the second position P2. The collecting means 40 has a collecting chamber 46 which is arranged under the flue gas duct 18 and is in the shape of an equilateral triangle with its tip pointed downwards. The walls of the collecting chamber 46 make an angle γ of about 60° to the horizontal plane. A discharge device 48, which may comprise a fluidised transport system, is used for periodic emptying of the collecting chamber 46. The collecting means 40 further has a deflecting wall 50, which extends in a direction opposite to the flow direction of the flue gas flow into the flue gas duct 18 in the lower portion 42 thereof. As shown in FIG. 2, the wall 50 starts from the end of the collecting chamber 46, which is the far end seen in the flue gas flow direction, and extends obliquely upwards into the flue gas duct 18. The deflecting wall 50 makes an angle δ of about 60° to the horizontal plane and is terminated by a deflecting line 52, which extends transversely to the flue gas duct 18 in the horizontal direction. From the deflecting line 52 extends in the flue gas flow direction a rear wall 54 included in the vertical flue gas duct 20.

The collecting chamber 46 further has a collecting wall 56, which extends from the wall 58 of the collecting chamber 46 which is closest to the first position P1 to the deflecting wall 50 and at a level in the vertical direction which is located below the level, in the vertical direction, of the deflecting line 52, which in turn is located above the bottom 60 of the flue gas duct 18.

Figure 3:
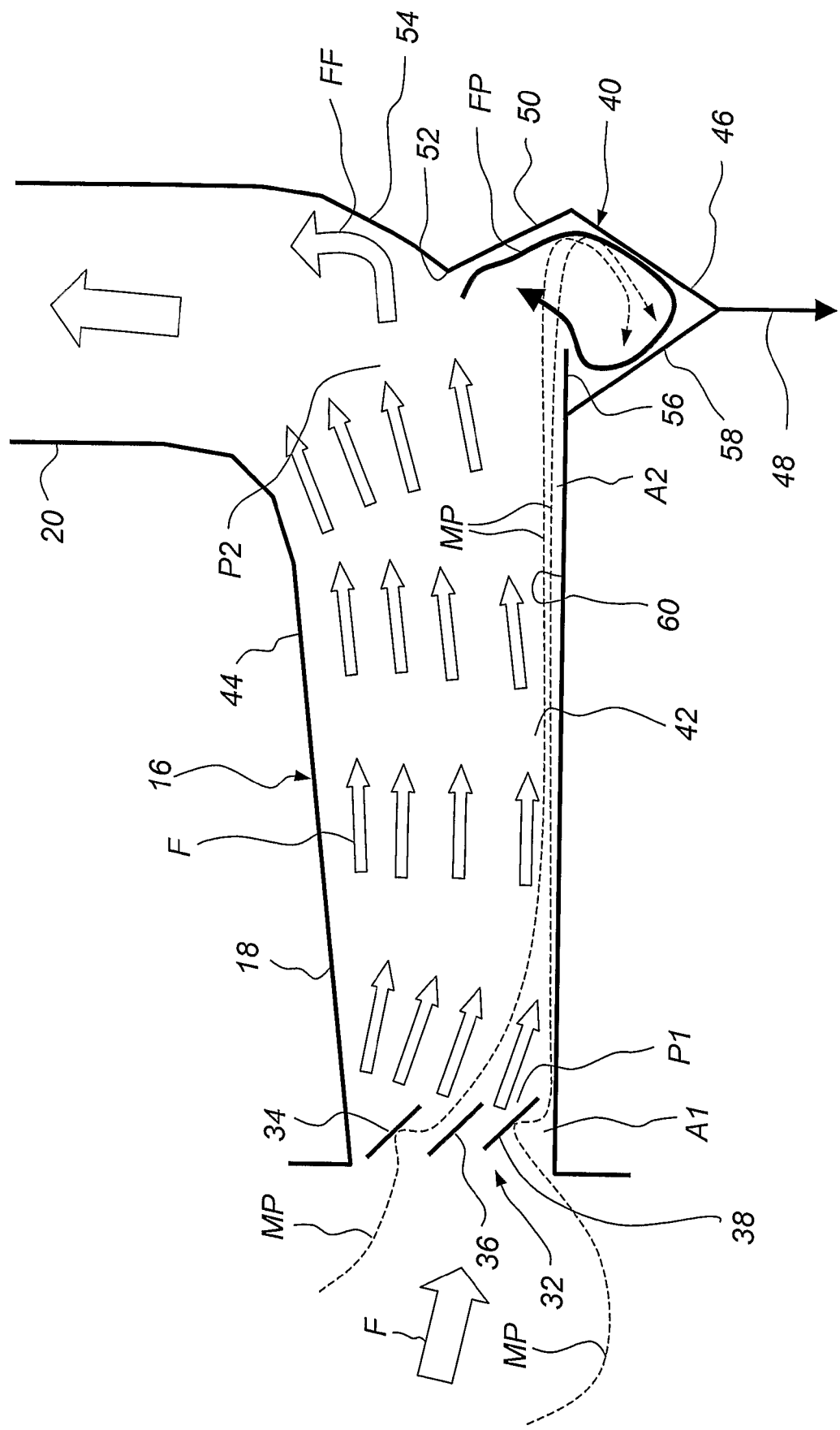
FIG. 3 is a side view and shows how particles are deflected and collected in the device shown in FIG. 2.

FIG. 3 shows how flue gases F and medium-coarse Particles MP can be expected to behave in the device 16 in operation. Medium-coarse particles here refer to particles of a size greater than about 1 mm but smaller than about 10 mm, which is the particle sizes that may be expected to cause maximum problems with clogging in the catalyst layers 24, 26, 28. Coarse particles, which refer to particles of a size greater than about 10 mm, will frequently be separated in the dust hopper 12 of the flue gas cooler 6, but in cases where this does not occur, also these particles will be separated in the device 16. Fine particles, which refer to particles of a size smaller than 1 mm, will be separated in the device 16 to a limited extent only. As mentioned above, the flue gas flow F will, when leaving the lower portion 10 of the flue gas cooler 6, be reversed to a substantially horizontal flow direction. As the flue gas flow F reaches the baffle arrangement 32 arranged in the first position P1, the flue gas flow F will be deflected downwards to the lower portion 42 of the flue gas duct 18. The velocity of the flue gas flow F in the first position P1 is about 20 m/s. When the flue gas flow F is passed to the second position P2, the effects of the deflection will fade and the flue gas flow F in the second position P2 will have a fairly uniform gas velocity profile. Since the cross-sectional area A2 in the second position P2 is greater than the cross-sectional area A1 in the first position P1, the velocity of the flue gas flow F will gradually decrease to become about 13 m/s in the second position P2.

The medium-coarse particles MP will, as is evident from FIG. 3, bump into the plates 34, 36, 38 and bounce downwards to the lower portion 42 of the flue gas duct 18. FIG. 3 shows typical patterns of movements for these particles MP by dashed lines. As indicated in FIG. 3, some particles MP can, when leaving the lower portion 10 of the flue gas cooler 6, have a movement directed obliquely upwards, but also these particles MP are deflected downwards by the plates 34, 36, 38. After having thus bounced down to the lower portion 42 of the flue gas duct 18, the medium-coarse particles MP will not be redispersed in the flue gas flow F but continue to move along the bottom 60 of the duct 18. The baffle arrangement 32 will have an equalising effect on the velocity profile of the flue gas flow F in the flue gas duct 18 and reduce the formation of eddies which could whirl up the particles MP from the lower portion 42. The fact that the velocity of the flue gas flow F decreases from the first position P1 to the second position P2 further reduces the tendency of the flue gas flow F to get hold of the medium-coarse particles MP again and entrain them. On the contrary, a settling effect is achieved owing to this reduction of velocity, where the medium-coarse particles MP are moved closer and closer to the bottom 60 of the duct 18. In the second position P2 the deflecting line 52, in which a stagnation point is formed, will deflect a first partial flow FP, which is passed downwards by the deflecting wall 50 into the collecting chamber 46. The deflecting line 52 should be placed at such a level above the bottom 60 and the deflecting wall 50 should have such an angle δ to the horizontal plane that the first partial flow FP obtains a gas velocity of maximum about 5-6 m/s in a standing eddy which is formed in the collecting chamber 46. The rest of the flue gas flow is deflected as a second partial flow FF by the wall 54 upwards and into the vertical flue gas duct 20. The deflected first partial flow FP will entrain the medium-coarse particles MP and press them down into the collecting chamber 46. In the collecting chamber 46 the partial flow FP is caused to make a sharp turn, thus making the medium-coarse particles MP being pressed by centrifugal force out against the walls 58 of the chamber 46 and thus being separated. The collecting wall 56 will contribute to the sharp turn that the partial flow FP is forced to make and further increase the amount of particles MP which is removed from the partial flow FP. Moreover the collecting wall 56 will reduce the risk that particles can be entrained from the collecting chamber 46 and redispersed in the flue gas. As is evident from FIG. 3, the partial flow FP will after the sharp turn past the collecting wall 56 again be mixed with the flue gas flow. According to the design of the collecting means 40, the partial flow FP can form a more or less stable standing eddy in the collecting chamber 46 with a greater or smaller gas exchange with the main flue gas flow. Irrespective of the gas exchange, the partial flow FP will, however, entrain the particles MP down into the collecting chamber 46.

Figure 4:
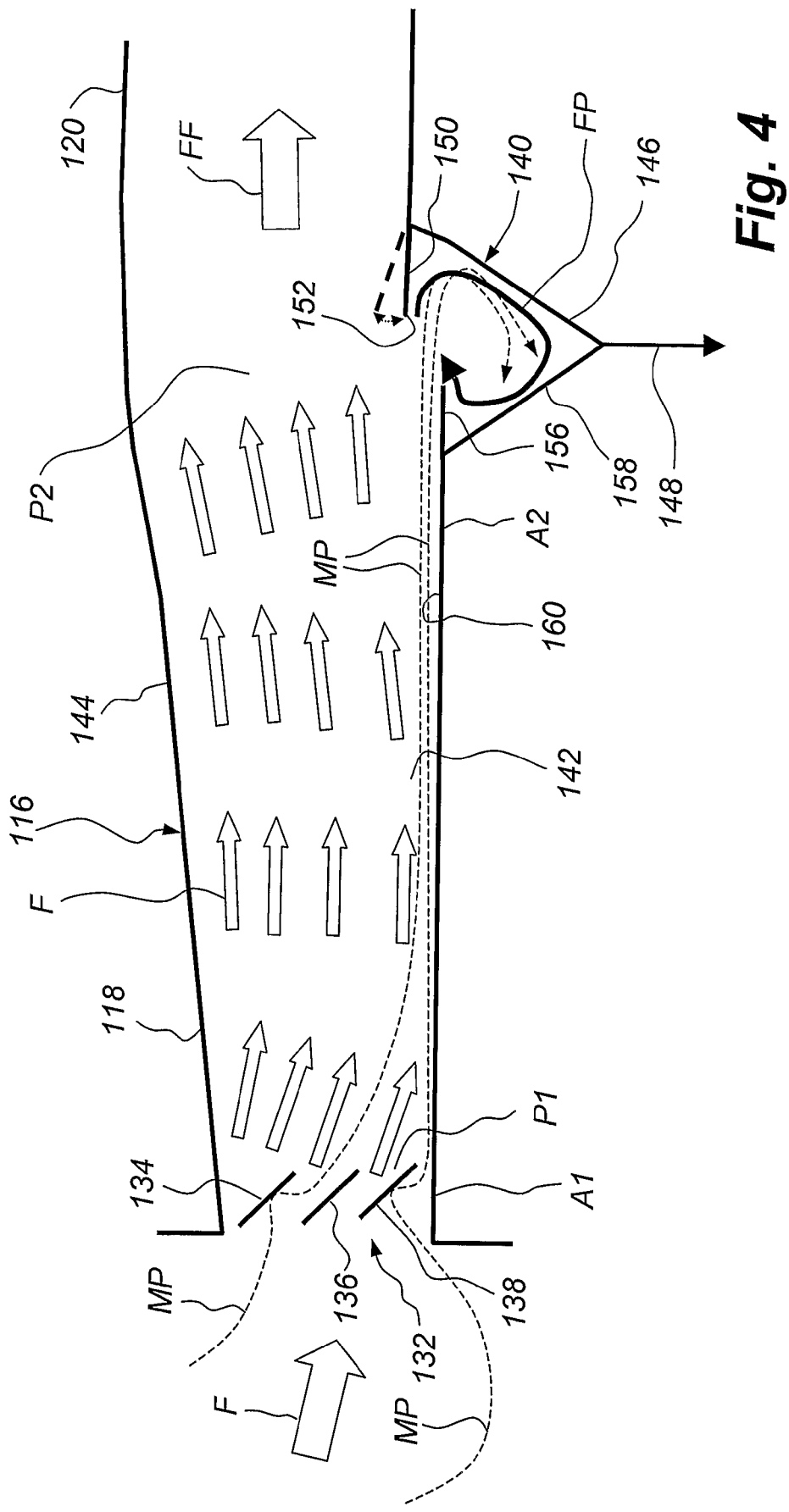
FIG. 4 is a side view and shows how particles are deflected and collected in an alternative embodiment of a device according to the invention.

FIG. 4 shows an alternative embodiment of the present invention in the form of a device 116. The device 116 has a horizontal flue gas duct 118, which passes a flue gas flow F in a substantially horizontal direction from a first position P1, which is positioned in the connection of the flue gas duct 118 to a flue gas cooler (not shown in FIG. 4), to a second position P2 after which the flue gas flow F is passed on horizontally in a horizontal flue gas duct 120 to an SCR reactor not shown in FIG. 4. The device 116 further has in the first position P1 a baffle arrangement 132, which has inclined plates 134, 136, 138 and is of the same type as the baffle arrangement 32 shown above. In the baffle arrangement 132, the medium-coarse particles MP will be deflected, "bounce", down to the lower portion 142 of the flue gas duct 118. In the second position P2, the device 116 has a collecting means 140, which has a collecting chamber 146 which is of the same type as the chamber 46 shown in FIG. 2. The collecting means 140 further has a horizontal deflecting wall 150 which extends into the flue gas duct 118 in the direction opposite to the flow direction of the flue gas flow F and is terminated by a deflecting line 152, which is located above the bottom 160 of the flue gas duct 118. In the collecting chamber 146 a collecting wall 156 is mounted, which is of the same type as the collecting wall 56 and extends at a level below the deflecting wall 150. As shown in FIG. 4, the deflecting wall 150, which thus makes an angle of 0° to the horizontal plane, will at the deflecting line 152 deflect a partial flow FP which is passed down into the chamber 146 and there makes a sharp turn while the medium-coarse particles MP are being separated. The rest of the flue gas flow, symbolised by a partial flow FF, continues to the horizontal flue gas duct 120. It will be appreciated that the partial flow FF will also contain flue gases leaving the chamber 146, which means that the partial flow FF will be of the same size as the flue gas flow F which is supplied to the flue gas duct 118. The deflected partial flow FP in the chamber 146 forms a standing eddy with more or less exchange with the rest of the flue gas flow. The flue gas duct 118 has, like the flue gas duct 18 shown in FIG. 2, an upper wall 144 which, seen in the flow direction of the flue gas flow, is inclined upwards to the horizontal plane. Thus, the velocity of the flue gas flow will be lower in the second position P2 than in the first position P1, which reduces the risk that the particles MP which have bounced down to the lower portion 142 will again be dispersed in the flue gas. In an alternative embodiment, the deflecting wall 150 can be provided with a hinge at its point of attachment and thus be pivotable, which is indicated by dashed lines in FIG. 4, for adjustment of the angle of the wall 150 to the horizontal plane and, thus, of a suitable first partial flow FP.

Figure 5:
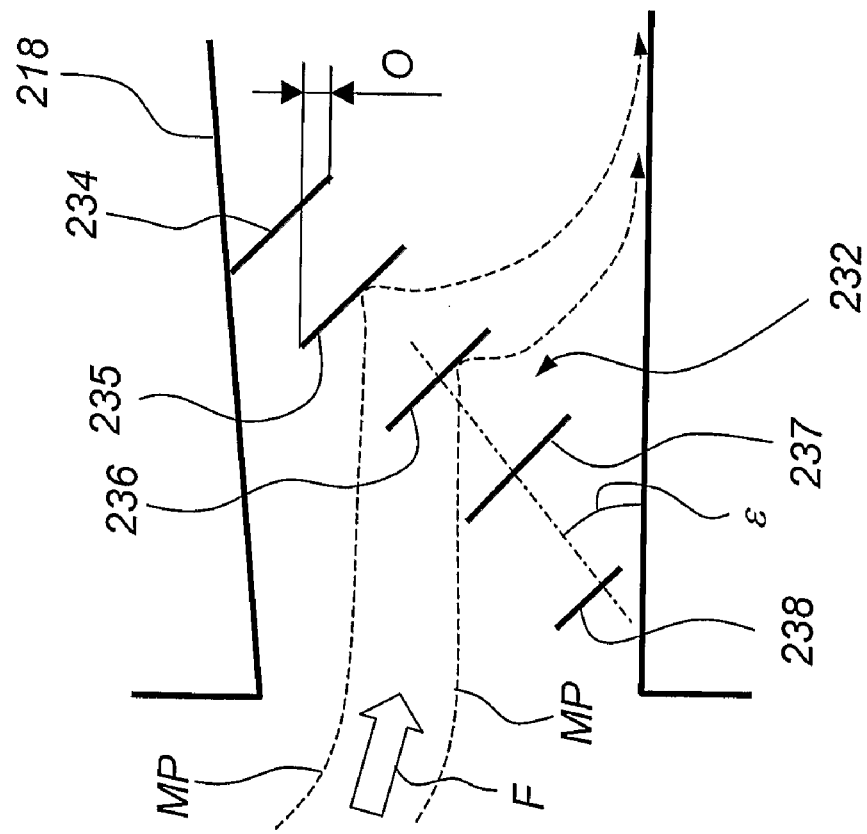
FIG. 5 is a side view and shows a baffle arrangement according to an alternative embodiment.

FIG. 5 shows a baffle arrangement 232 according to an alternative embodiment. The baffle arrangement 232, which is arranged in a flue gas duct 218, which is of the same type as the flue gas duct 18 described above, has five inclined plates 234, 235, 236, 237, 238. These plates are placed along a line which is inclined at an angle $\epsilon$ of about 45° to the horizontal plane and which line thus, seen in the flow direction of the flue gas flow F, is inclined upwards. Thus, the plates 234, 235, 236, 237, 238 are not placed vertically one above the other. As is evident from FIG. 5, the plates 234 and 235 overlap each other, seen in the horizontal direction, a distance O (the remaining plates overlap each other correspondingly). This overlap O decreases the risk that a particle, symbolised by MP, can pass the baffle arrangement 232 without colliding against a plate 234, 235, 236, 237, 238, which is also illustrated in FIG. 5 with two typical paths of movement for medium-coarse particles MP.

Figure 6:
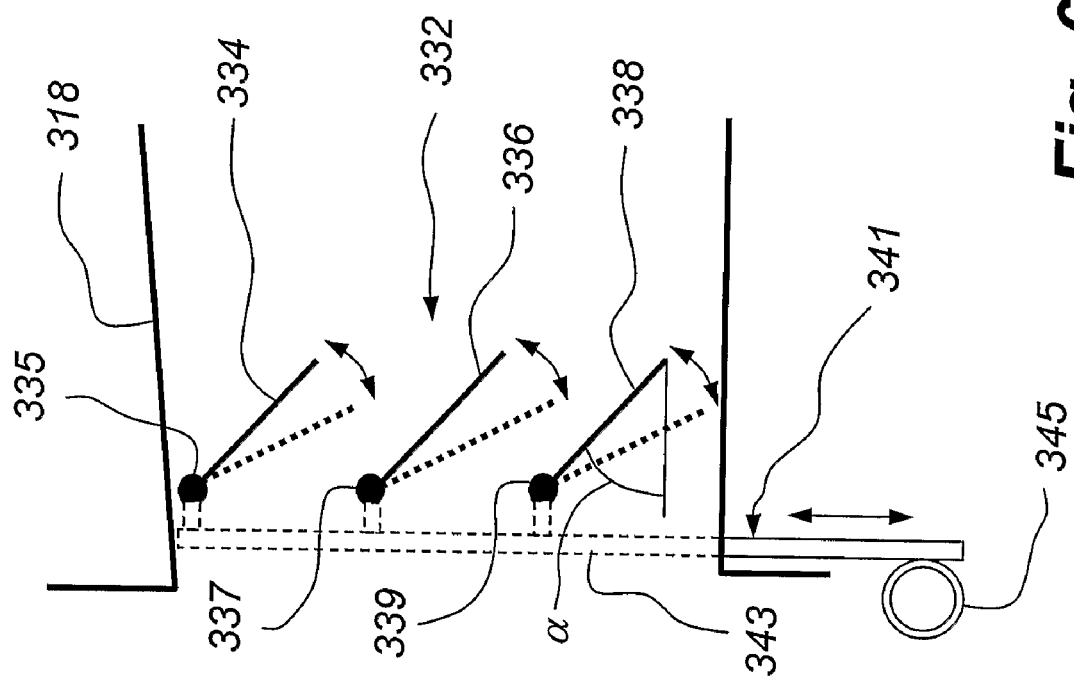
FIG. 6 is a side view and shows a baffle arrangement according to another alternative embodiment.

FIG. 6 shows a baffle arrangement 332 according to another alternative embodiment. The baffle arrangement 332, which is arranged in a flue gas duct 318, which is of the same type as the flue gas duct 18 described above, has three inclinable plates 334, 336, 338. Each plate 334, 336, 338 is, which in FIG. 6 is indicated by a respective dashed plate, pivotable on an associated horizontal shaft 335, 337, 339. The horizontal shafts 335, 337, 339 are attached to an actuator 341 which is schematically indicated and arranged outside the flue gas duct 318 and comprises a guide rail 343 which is connected to a motor 345. The position of the guide rail 343 in the vertical direction can be set by the motor 345, and consequently the plates 334, 336, 338 can be pivoted to a desired angle $\alpha$ to the horizontal plane. Thus, it can be tried out by experiments what angle $\alpha$ gives a sufficient separation of the medium-coarse particles so as to prevent clogging of the SCR reactor without causing an unnecessarily high pressure drop across the baffle arrangement 332. The baffle arrangement 332 can also be configured in such a manner that the plates can be pivoted to an angle $\alpha$ of 90° to the horizontal plane, in which case the baffle arrangement 332 may also function as a shut-off damper.

Figure 7:
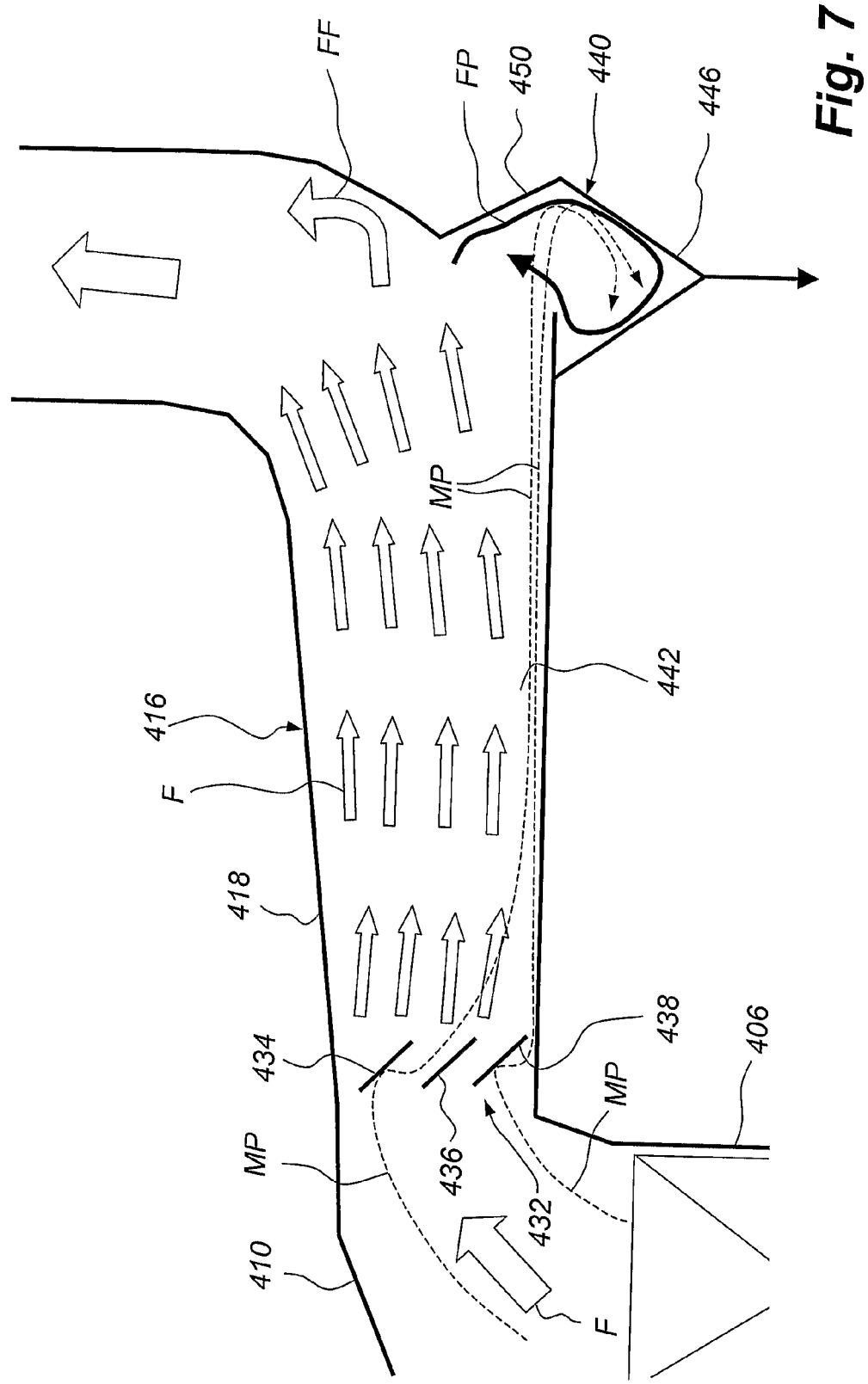
FIG. 7 is a side view and shows yet another alternative embodiment of the present invention.

FIG. 7 shows a device 416 according to yet another alternative embodiment. The device 416, which is much the same as the device 16 shown in FIG. 2 and therefore will not be described in all details, is connected after a flue gas cooler 406, which is only partly shown in FIG. 7. The flue gas cooler 406 is passed by an upwards directed vertical flue gas flow F. In the upper portion 410 of the flue gas cooler 406 the flue gas flow F changes to a horizontal flow direction and flows into the device 416. The device 416 has a flue gas duct 418 and, arranged therein, a baffle arrangement 432 which has three inclined plates 434, 436, 438. As is evident from FIG. 7, medium-coarse particles MP will bounce on the plates 434, 436, 438 and be heavily deflected down to the lower portion 442 of the duct 418. The baffle arrangement 432 will also deflect the flue gas flow F and contribute to make the gas velocity profile in the duct 418 uniform, which reduces the risk of the deflected particles MP again being dispersed in the flue gas flow F. The device 416 further has a collecting means 440, which has a deflecting wall 450. The deflecting wall 450 will, in a manner similar to that described with reference to FIG. 3, deflect a partial flow FP which passes the medium-coarse particles MP down into a collecting chamber 446.

It will appreciated that many modifications of the embodiments described above can be made within the scope of the appended claims.

For instance, it will be appreciated that the separation of particles performed by the device can be adjusted by selecting suitable plates of the baffle arrangement in terms of number, size and angle of the plates to the horizontal plane, so that particles of such a size that they risk to clog the catalyst layers involved are separated to the desired extent without the pressure drop in the device being unnecessarily high. The openings in the catalyst have a size which can be designated $d_H$. A rule of the thumb is that the main part of the particles having a size equal to or greater than $0.5*d_H$ should be separated before they reach the catalyst. In the example described in FIG. 1, the openings are squares with 4 mm sides, i.e. $d_H$=4 mm, which means that particles with a size of 2 mm and larger should be separated before the catalyst.

The walls of the collecting chamber 46 need not necessarily make an angle $\gamma$ of about 60° to the horizontal plane. The angle $\gamma$ is selected in such a manner that a suitable flow ratio of the partial flow FP in the collecting chamber 46 is achieved and so that separated particles can slide down to the discharge device 48 at the bottom of the collecting chamber 46. It has been found that in many cases an angle $\gamma$ of about 40-70° very well satisfies these criteria.

As is evident from that stated above, the deflecting wall 50, 150 can make different angles $\delta$ to the horizontal plane. In many cases an angle $\delta$ of about 0-70° is preferred to provide an appropriate first partial flow FP.

The velocity of the flue gas flow in the flue gas duct 18; 118 can be varied within wide limits. However, it is especially preferred for the velocity of the flue gas flow F in the first position P1 to be about 13-25 m/s since a velocity in this range implies that the medium-coarse particles MP effectively bump against the plates 34, 36 etc. down to the lower portion 42; 142 of the flue gas duct 18; 118.

The invention claimed is:

1. A method of separating particles from a flue gas flow that flows substantially horizontally from a first position to a second position in a horizontally extending flue gas duct having a lower portion comprising the steps of:

subjecting the particles to deflection in the first position of the horizontally extending flue gas duct downwards to the lower portion of the horizontally extending flue gas ducts, wherein the particles are deflected downwards at an angle of 40 degrees-70 degrees to the horizontal plane of the horizontally extending flue gas duct;

dividing the flue gas flow in the second position of the horizontally extending flue gas duct into both a first partial flow containing the deflected particles that is deflected to the lower portion of the horizontally extending flue gas duct and flows downwardly into a collecting chamber, and a second partial flow; and collecting in the second position of the horizontally extending flue gas duct the particles from the lower portion of the horizontally extending flue gas duct.

2. The method of separating particles from a flue gas flow as claimed in claim 1 further comprising the step of: making the first partial flow undergo a sharp turn in the collecting chamber such that the deflected particles contained in the first partial flow are thrown out of the first partial flow and are thereby separated from the first partial flow in the collecting chamber.

3. A device for separating particles from a flue gas duct comprising:

a horizontally extending flue gas duct through which the flue gas flow is made to flow substantially horizontally from a first position of the horizontally extending flue gas duct to a second position of the horizontally extending flue gas duct, the horizontally extending flue gas duct having a lower portion;

a baffle arrangement located at the first position of the horizontally extending flue gas duct, the baffle arrangement including at least one plate, the at least one plate being inclined so as to deflect particles from the flue gas flow down to the lower portion of the horizontally extending flue gas duct, wherein the at least one plate is inclined at an angle of 40 degrees-70 degrees to the horizontal plane of the horizontally extending flue gas duct; and a collecting means located at the second position of the horizontally extending flue gas duct for collecting the particles at the first position of the horizontally extending flue gas duct have been deflected by the at least one plate from the flue gas flow downwards to the lower portion of the horizontally extending flue gas duct, wherein the collecting means includes a deflecting wall that extends into the lower portion of the horizontally extending flue gas duct opposite to the flow direction of the flue gas flow and above the bottom of the horizontally extending flue gas duct and terminates in a deflecting line such that the deflecting wall is arranged so as to deflect from the flue gas flow a first partial flow that contains the deflected particles and that is arranged so as to flow into a collecting chamber that is included into the collecting means.

4. The device for separating particles from a flue gas flow as claimed in claim 3 wherein the collecting means includes a collecting wall that extends from the portion of the collecting chamber that is positioned closest to the first position of the horizontally extending flue gas duct at a level below the deflecting line of the deflecting wall of the collecting means.

* * * * *